I. L. ANDERSON.
Wagon-Axle and Thimble-Skein.

No. 160,502.    Patented March 9, 1875.

Witnesses.
WM. Edwards
Henry Infeld

Inventor.
Isaac L. Anderson
Per Fitch & Fitch
Attys.

THE GRAPHIC CO.PHOTO-LITH.39 & 41 PARK PLACE,N.Y.

UNITED STATES PATENT OFFICE.

ISAAC L. ANDERSON, OF LANCASTER, MISSOURI.

IMPROVEMENT IN WAGON-AXLES AND THIMBLE-SKEINS.

Specification forming part of Letters Patent No. 160,502, dated March 9, 1875; application filed February 3, 1875.

*To all whom it may concern:*

Be it known that I, ISAAC L. ANDERSON, of Lancaster, Schuyler county, State of Missouri, have invented an Improved Wagon-Axle and Thimble-Skein, of which the following is a specification, reference being had to the accompanying drawings forming part hereof.

My invention relates to a wagon-axle and thimble-skein, so constructed and adjusted to one another that the thimble-skein is braced securely upon the spindle of the axle and forms a level bearing for the wheel, and having a tension-rod so arranged that great firmness and strength of all the parts are secured.

Figure 1:
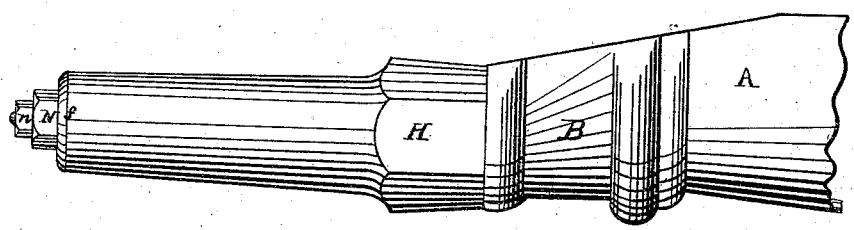
Figure 2:
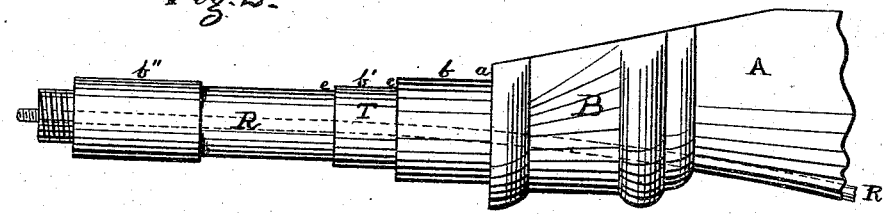
Figure 3:
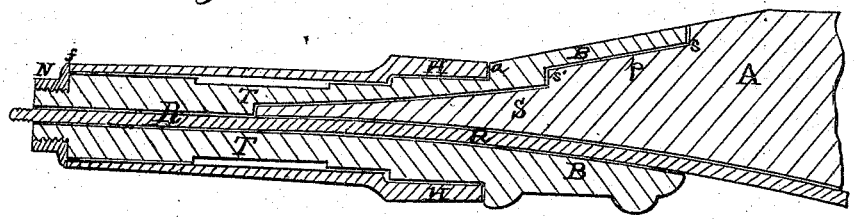
Figure 4:
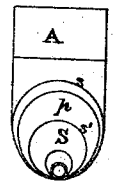

Figure 1 is a side elevation of one end of an axle embodying my invention and having my thimble-skein with the wheel-hub in place upon it. Fig. 2 is a similar view of the same, showing the parts with the wheel-hub removed. Fig. 3 is a longitudinal central sectional view of the parts shown in Fig. 1. Fig. 4 is an end view of the axle, with the thimble-skein removed, and showing the tapered spindle.

Similar letters of reference indicate similar parts.

A is the wooden axle, formed, as shown in the drawings, with the tapered spindle S, having the prominence or projection $p$ and the shoulders $s$ and $s'$ upon its upper side. The shoulders $s$ and $s'$ have, preferably, a bearing-surface of one-half of one inch each. T is the thimble, cast, of iron or other suitable metal, in the form shown in the drawings—that is, with the socket B upon its butt end made to fit snugly upon the projection $p$ upon the spindle S, and to conform to the same, and bearing upon the shoulders $s$ and $s'$, and with a longitudinal aperture extending its whole length, as shown, by means of which the thimble is adjusted upon the spindle of the axle and the tension-rod, hereinafter described. The thimble T is constructed with a half-inch shoulder, $a$, which forms a bearing for the butt of the wheel-hub H, and a level bearing-surface for the wheel-hub, ten inches in length, which is formed as follows, namely, a bearing, $b$, two inches in length, then an offset, $c$, of one-eighth of an inch, then a bearing, $b'$, one inch in length, then the offset $e$ of about one-sixteenth of an inch, and upon the outer end of the thimble a bearing, $b''$, three inches in length, and of the same diameter as the bearing $b'$. The extreme end of the thimble is formed with a screw-thread to receive the nut N, which is provided with the flange $f$, which forms a bearing for the outer end of the wheel-hub. R is the tension-rod, adjusted in a groove in the under side of the axle and extending under the spindles S, upon each end of the axle, through the apertures in the thimbles T, and provided with a nut, $n$, upon its extreme ends.

Now, it is evident that the thimble T is held securely in place upon the spindle S by means of the projection $p$ and the shoulders $s$ and $s'$ formed upon the spindle, and upon which the cup or socket B upon the butt of the thimble is adjusted to fit snugly. It is also evident that the form given to the entire spindle S and to the butt and bearings of the thimble T gives great strength to those parts of the axle and skein where the greatest strain occurs; and it is also evident that, by means of the tension-rod R, which may be tightened up by means of the nuts $n$, additional strength is given to the axle and the skein, and their capacity for sustaining a heavy weight largely increased.

It is also evident that, by means of the bearings $b$, $b'$, and $b''$ formed on the thimble T, while the strength of the parts at the points of maximum strain is increased, a perfectly level bearing for the wheel upon the thimble is secured, thereby lessening the liability of the wheel-hub to wear upon the flange $f$ of the nut N, or upon the shoulder $a$ of the thimble, when traveling over an uneven surface.

Having thus described my invention, what I claim as new, and desire to secure by Letters Patent, is—

The combination of the axle A, formed with the shoulders $s$ and $s'$, the projection $p$, and the tapered spindle S, the thimble T formed with the socket B, shoulder $a$, the level bearings $b$, $b'$, and $b''$, nut N, tension-rod R, adjusted in a groove on the under side of the axle A and its spindle S, and extending through a longitudinal aperture in the thimble T, and the nut $n$, all constructed to operate substantially as and for the purpose specified.

ISAAC L. ANDERSON.

Witnesses:
J. W. KNOTT,
J. B. GAMBLE.